United States Patent [19]

Van Gennip

[11] Patent Number: 5,521,721
[45] Date of Patent: May 28, 1996

[54] SUPERIMPOSITION OF IMAGES IN A DIGITAL COPIER OR PRINTER

[75] Inventor: Johannes W. M. H. Van Gennip, Venlo, Netherlands

[73] Assignee: Oce Nederland, B.V., Venlo, Netherlands

[21] Appl. No.: 370,549

[22] Filed: Jan. 9, 1995

Related U.S. Application Data

[63] Continuation of Ser. No. 118,658, Sep. 10, 1993, abandoned.

[30] Foreign Application Priority Data

Sep. 10, 1992 [NL] Netherlands ............................ 9201570

[51] Int. Cl.⁶ ......................................................... H04N 1/40
[52] U.S. Cl. ............................ 358/455; 358/462; 358/534; 358/456; 355/244
[58] Field of Search ............................... 355/244, 79, 114, 355/127

[56] References Cited

U.S. PATENT DOCUMENTS

| | | | |
|---|---|---|---|
| 3,828,319 | 8/1974 | Owen et al. | |
| 3,849,592 | 11/1974 | Rosenheck | 178/6 |
| 4,506,301 | 3/1985 | Kinglsey et al. | 358/462 |
| 4,547,812 | 10/1985 | Waller et al. | 358/283 |
| 4,668,995 | 5/1987 | Chen et al. | 358/462 |
| 4,953,012 | 8/1990 | Abe | 358/75 |
| 4,996,603 | 2/1991 | Kanemitsu et al. | 358/462 |
| 5,249,067 | 9/1993 | Hirosawa | 358/462 |

FOREIGN PATENT DOCUMENTS

| | | |
|---|---|---|
| 0038497 | 10/1981 | European Pat. Off. . |
| 0234809 | 9/1987 | European Pat. Off. . |
| 0397428 | 11/1990 | European Pat. Off. . |
| 2102240 | 1/1983 | United Kingdom . |
| 2117208 | 10/1983 | United Kingdom . |

*Primary Examiner*—Scott A. Rogers
*Assistant Examiner*—Madeleine Anh-Vinh Nguyen
*Attorney, Agent, or Firm*—Birch, Stewart, Kolasch & Birch

[57] ABSTRACT

A method and reproduction system for generating image information signals of a second type for each image point, upon supply of digital image information signals of a first type generated in a multi-bit form by a first and second signal source and making use of the information content concerning the density value present in the signals. The second signal source is adapted to generate image information signals in accordance with a predetermined density value. The image information signals of the second type are converted, by the application of grey value processing, to image reproduction signals which are used to control an image reproduction system such as a printer.

14 Claims, 6 Drawing Sheets

SUPERIMPOSITION OF IMAGES IN A DIGITAL COPIER OR PRINTER

This application is a continuation, of application Ser. No. 08/118,658 filed on Sep. 10, 1993, now abandoned.

BACKGROUND OF THE INVENTION

1. Field of the Invention

The present invention relates to an imaging system and, more specifically, to a method and apparatus for reproducing image information by means of digital image information signals and ensuing image reproduction signals.

2. Discussion of Related Art

A method and a reproduction system for reproducing image information by means of image reproducing signals is disclosed in U.S. Pat. No. 4,953,012. The method described in this patent specification, in which the information content concerning the density value relates to the black value required in reproducing the information, has the disadvantage that as a result of the 1-bit representation form of the image information signals produced by the first and second signal source or signal generator it is inevitable that the selection based on information content in respect of the density value comes down to the simple selection of black reproduction wherever possible. Reproduction of the combined image on this basis, in which, for example, optically scanned image portions and synthetically formed image portions occur, does not allow the different image portions to be reproduced distinguishably.

SUMMARY OF THE INVENTION

Therefore, it is an object of the present invention to provide a digital reproduction system which will overcome the above-noted disadvantages.

A further object of the present invention is to provide a method of reproducing image information from digital image information signals, making use of the information content concerning the density value present in the signals to produce image reproduction signals.

Still, a further object of the present invention is to provide a reproduction system for reproducing image information by means of image reproducing signals.

The foregoing objects and others are accomplished in accordance with the present invention, generally speaking, by providing a method of generating image information signals of a second type for each image point, upon supply of digital image information signals of a first type generated by a first and second signal source and making use of the information content concerning the density value present in the signals, in order to produce image reproduction signals required in an imaging system. The reproduction system for reproducing image information by means of image reproducing signals according to this method is provided with a first signal generator and second signal generator for generating digital image information signals of a first type, and a third signal generator for generating image information signals of a second type for each image point, upon supply of digital image information signals of a first type generated by the first and the second signal generator and making use of the information content concerning the density value present in the signals. In such a method and with such an apparatus the signals produced by the first signal source or signal generator can be obtained, for example, at least partly by optical scanning, and the signals produced by the second signal source or signal generator can be obtained, for example, synthetically or by the use of a bit map.

According to the invention, in the method of the type described, the supply of the image information signals of the first type takes place in a multi-bit representation form, the generation of the image information signals by the second signal source takes place in accordance with a predetermined density value, and the image information signals of the second type are converted to the image reproduction signals by using grey value processing. Also, in the reproduction system of the type described, according to the invention, the first and second signal generators are adapted to generate the image information signals in a multi-bit representation form, the second signal generator is provided with means for revaluing the image information signals in accordance with a given density value, and means are provided for performing grey value processing on the image information signals generated by the third signal generator, for the purpose of producing the image reproduction signals. If image information relates significantly to line drawings, such as building drawings and geographic maps, which are required to be provided with text information, perceptibly it is preferable for the information relating to the line drawings to retain the darker character thereof and to reproduce the text information with a lighter grey value. In this connection a surprising result is obtained if this text information is suppressed at the location of the information relating to the line drawings. A situation of this kind is achieved when information relating to the line drawings is generated by the first signal source and the text information by the second signal source in accordance with a moderate grey value, selection of image information signals then taking place on the basis of the highest density value. Thus, for example, a route traced by a pair of parallel black lines on a route map will be reproduced unchanged and without interruption, and a text applied in grey will be suppressed at the location of the black lines. This gives the impression of applying a grey stamp impression to an information support at the location of dark information in line form.

On the other hand, in the reproduction of a subject with several black areas with text therein, this text must be reproduced in a lighter form but intact. To this end, the information in respect of the black areas is again produced by the first signal source, and the text information by the second signal source, while during a selection procedure the text information signals, despite the lower grey value, are given priority over the information signals relating to the black areas. It is also possible to multiply the density values of the two image information signals or combine them in some other way, and create therefrom a density value for the new image information signal to be generated. Here again it is possible to obtain a resolving power in the reproduction between the image information and the text information.

The application of the invention is not limited to the reproduction of information in the black/white or achromatic range. The invention can also be applied in the monochromatic range and even in the multi-color range, in which case a selection criterion to be applied can also be based on the grey value component or intensity value in connection with a measured value of an image point. In color reproduction technology, using the UCR method, it is possible to determine how large the grey value component is in the case of an optically scanned color image point. The grey value component is then added as an extra data component by the first signal source to the image information signal of an image point. Conversion circuits for converting RGB values to HSL values (or values in other related color spaces, such as the LCH space or the CIELAB space) can be effectively applied here since they can deliver the required intensity component (L) quickly. If the second signal source delivers the information synthetically, the intensity component in addition to any other settings required in connection with the image point can be manually set by the user.

BRIEF DESCRIPTION OF THE DRAWINGS

The invention will now be explained with reference to the accompanying drawings wherein.

DETAILED DISCUSSION OF THE INVENTION

Figure 1:
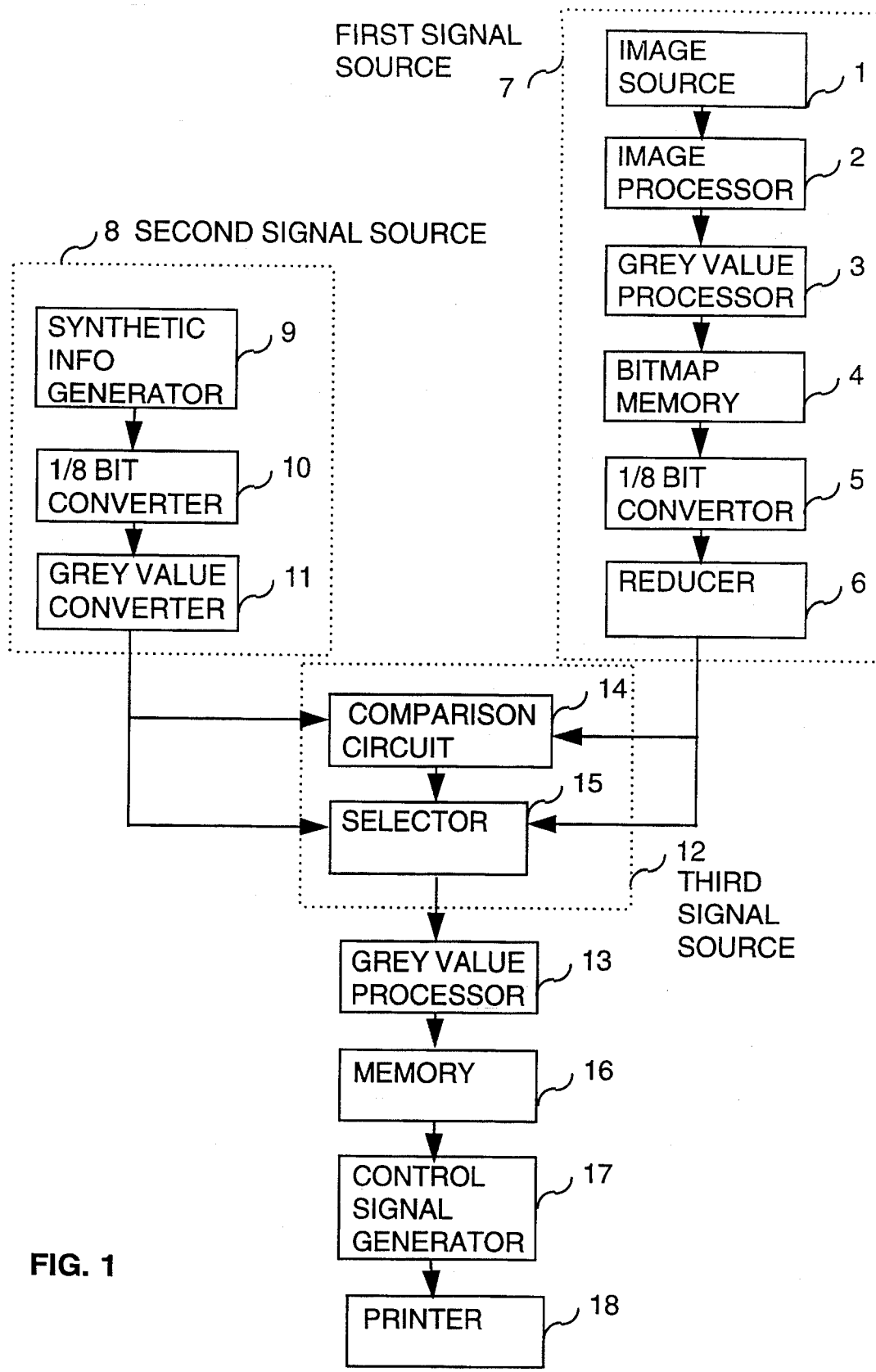
FIG. 1 shows a first possible embodiment of an apparatus for generating, processing and selecting image information signals according to the indicated method.

FIG. 1 illustrates an apparatus, such as a digital black and white copier, which is suitable for generating, processing and selecting image information signals to give image reproduction signals intended for a reproduction unit (such as a printer unit). In this Figure, there is provided a unit (scanner) 1 for optically scanning an original point by point. Unit 1 may also be arranged for the generation of a synthetic image and, for example, may be a computer. The grey value information obtained for each scanned point in these conditions is specified as accurately as possible in a multi-bit digital number for the grey value processing which is still required. In view of the number of grey value gradations which can be reproduced clearly and recognizably when a printer is used, an 8-bit representation form for reproducing a measured grey value information will be kept to in the description of the apparatus to be given here. Corrective actions also take place in unit 1 in order to eliminate certain faults which have occurred in the scanning of the original. The 8-bit image information signal obtained with unit 1 is then fed to an image processing unit 2 for performing an image processing operation adapted to grey value information. In the unit 2 the supplied image information signal is subjected to a number of image processing processes, such as the correction of the information in conjunction with the background, and the segmentation and filtration of information. The output signal produced by unit 2 still has an 8-bit representation form and has to be converted to a 1-bit representation form for the reproduction of image information. This takes place in unit 3, which is adapted to perform grey-value processing. Such a grey-value processing may, for example, comprise an "error diffusion" process, in which, despite such processing, the grey value impression of the original is nevertheless well retained. The entire grey value image is then written into a bit-map memory 4 and in principle can be used to generate control signals for controlling a printer.

To be able to compare signals of different grey value levels with each other in a later phase, and select on grey value information, the image information signal written into the memory 4 for each image point is fed according to the principle of the invention to a conversion unit 5 in which the image information signal is converted from a 1-bit representation form to an 8-bit representation form. The chain of connected units 1 to 5, including certain reduction means 6 to be discussed hereinafter, can be regarded as a first signal source (or signal generator) 7, which for each image point produces an image information signal in a multi-bit representation form. The apparatus of FIG. 1 also comprises a second signal source (or signal generator) 8, with a unit 9 by means of which synthetic information, such as characters, logos or other graphic information, is generated.

An apparatus of this kind is disclosed in U.S. Pat. Nos. 4,953,012 and 3,828,319 and EP-A-0 038 497, in which the inclusion of synthetic information, such as text generated by a keyboard, in a reproduction system is described. The character information signals to be generated by unit 9 are also written in a 1-bit representation form for each image point. These character information signals must then be modified to a multi-bit representation form, for which purpose the signal source 8 also comprises a conversion unit 10 and a connecting transformation unit 11. The image information signal is converted from the 1-bit representation form to an 8-bit representation form in the conversion unit 10 for each image point. The grey value information of the signal fed by the conversion unit 10 is then changed in the transformation unit 11 in accordance with a pre-defined grey value setting. If, for example, the grey value is set to the middle of the grey value range in unit 11, then the (0) and the (1) representations delivered by unit 9, for example for a white or black reproduction respectively of an image point, will be converted to (11111111) or (01111111) respectively, to give a white or grey reproduction respectively for an image point. This last value then replaces (00000000) which would be associated with a black reproduction of an image point. For this purpose it is desirable to provide the apparatus additionally with a control means to enable a required grey value setting of the transformation unit 11 to be obtained manually. The image information signals obtained with signal sources 7 and 8 and relating to the same image point are then fed to a third signal generator 12 which, on the basis of the information present in these image information signals, in turn delivers an image information signal having a certain grey value information.

In order to distinguish between the signals to be produced by the various signal generators, the signals to be produced by the first and second signal generators 7 and 8 will be referred to as image information signals of the first type and the signals to be produced by the third signal generator 12 will be referred to as image information signals of the second type. The way in which the density value of an image information signal of the second type is determined will be explained in detail with reference to a number of embodiments.

In the embodiment shown in FIG. 1, the third signal generator 12 is constructed as a selector circuit which passes the image information signal having the highest density value (hence corresponding to the darkest information reproduction) to a connected unit 13 to perform a grey value processing operation (e.g. error diffusion) by which the 8-bit representation form of a grey value signal delivered by the selector circuit is in turn converted to a 1-bit representation form. In the embodiment of selector circuit, the third signal generator 12 comprises a comparison circuit 14 and a connected selection circuit 15. The 8-bit image information signals are fed from signal generators 7 and 8 to the comparison circuit 14 which checks which signal has the greatest density value. Depending on the result of the check, comparison circuit 14 passes a trigger signal to the selection circuit 15. The latter, which also receives the image information signals from the signal sources 7 and 8, will accordingly, on receipt of the trigger signal, select that image information signal having the highest density value. The 1-bit signals obtained with the grey value processing unit 13 are suitable for supply to a control signal generator 17 which generates control signals for a reproduction unit, such as a printer unit 18. However, it is also possible to first store the 1-bit signals temporarily in an image memory 16 and then feed them to the control signal generator.

However, it may be that a user wishes to reproduce the image information in a smaller image format. Since the reduction operation to be performed on an image should be possible for a different scale of format transitions and, in calculating the grey value of a new image point to be formed, a plurality of original image points are involved completely or else just partially, fractions of black values of the original image points are therefore also involved in the grey value calculation of a new image point to be formed. Because of the fractions required, it is advantageous to utilize for this purpose a grey value expressed in multi-bit form, and to carry out the reduction operation after the operation for converting the 1-bit signal to the 8-bit signal. After calculation of the required fractions, the calculation of the grey value then simply follows in the 8-bit representation form for the new image point to be formed. The reduction means 6 are therefore disposed after the conversion unit 5 in the signal generator 7.

Figure 2:
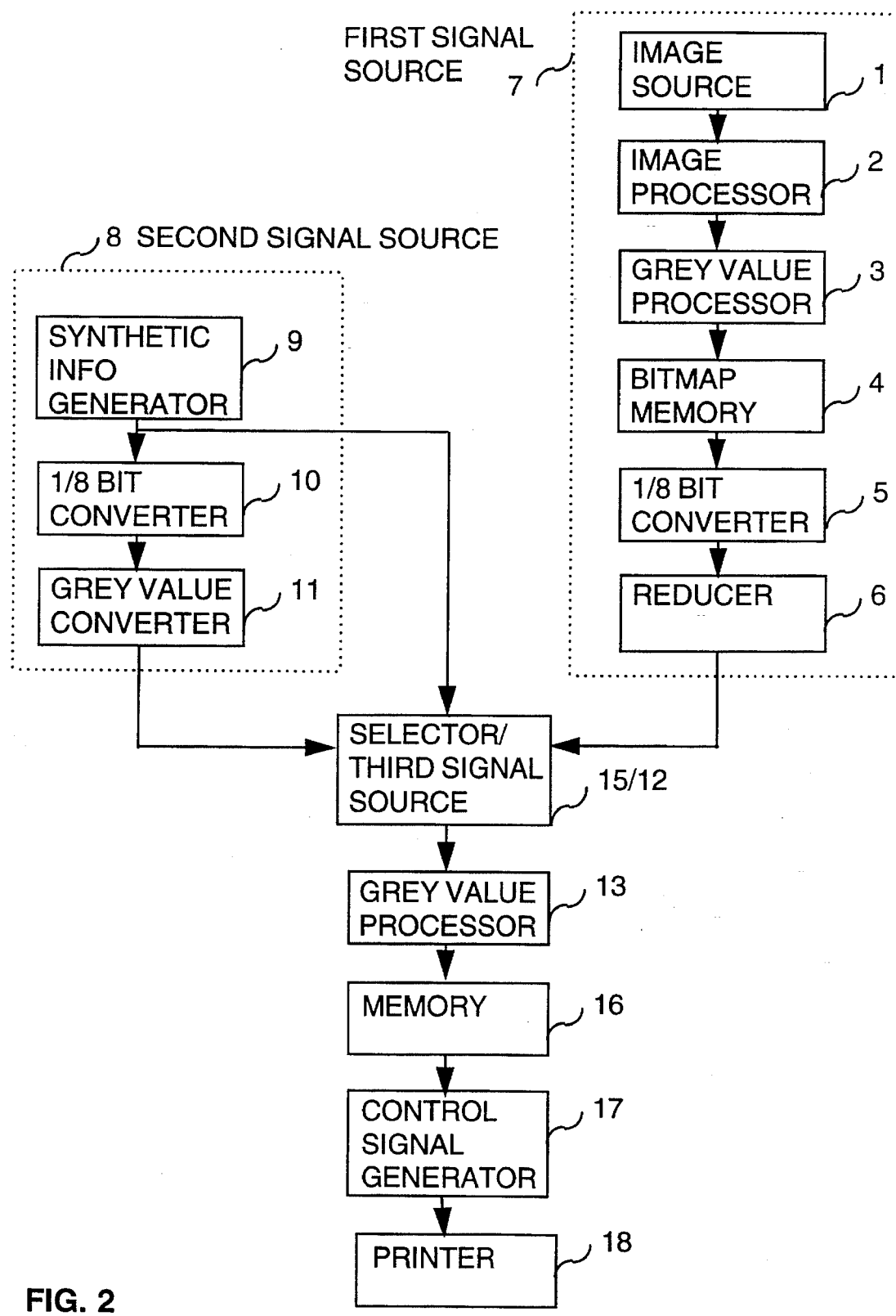
FIG. 2, FIG. 3, FIG. 4 and FIG. 5 respectively illustrate a first, second, third and fourth alternative embodiment of the embodiment shown in FIG. 1.

FIG. 2 illustrates an alternative embodiment of the apparatus shown in FIG. 1. In this embodiment, the grey value of an image information signal originating from the second signal generator is given priority over that of the first signal generator. Here again the third signal generator 12 functions as a selector circuit. Thus, whenever unit 9 generates a signal representing a black value (1), the signal will also cause the third signal generator 12 to deliver a corresponding grey value signal to be fed by the transformation unit or circuit 11 for unit 13. In all other cases the third signal generator 12 will pass the signal originating from the signal generator 7. To this end, the third signal generator 12 is constructed as a selection circuit in this embodiment and unit 9 will generate not only the image information signal intended for the conversion unit 10 but also a trigger signal for the selection circuit. As a result, independently of the possible grey values in the image information fed via the transformation unit 11, the synthetic text generated by unit 9 is always reproduced in the image to be produced by printer 18, it being possible to set the grey value level of that text optionally. It is also possible, in the embodiments illustrated, to dispose the third signal generator 12 not between the reduction means 6 and unit 13, but between the image processing unit 2 and unit 3, this being shown in FIGS. 3 and 4. In a configuration of this kind the output signal of the unit 2 already has an 8-bit representation form for the grey value processing so that the conversion unit 5 can be dispensed with in this embodiment. Since the text to be formed synthetically is introduced into the data path of the scanned information before the reduction means 6, the text information will also be subjected to the reduction operation of the means 6.

Figure 3:
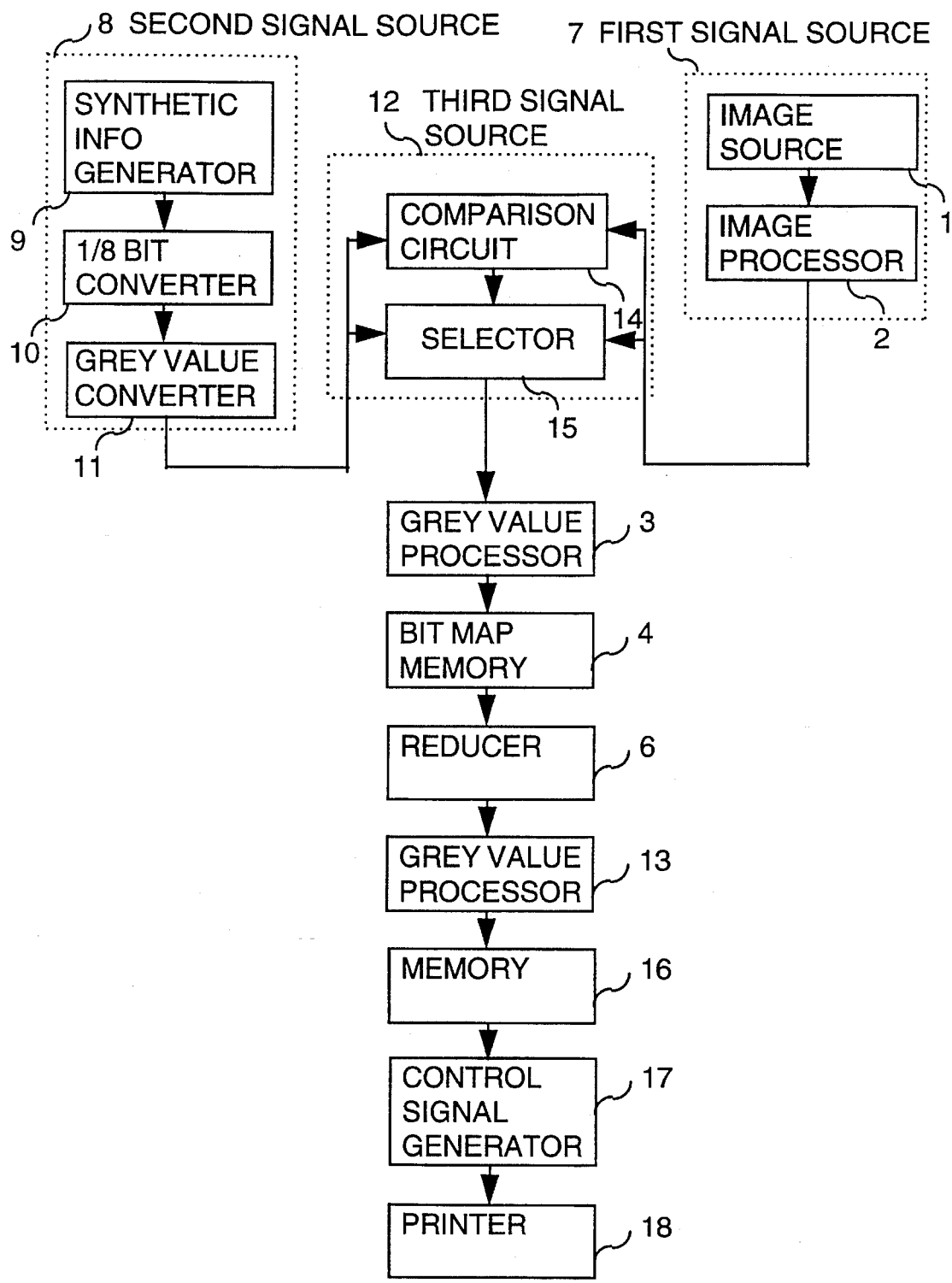
Figure 4:
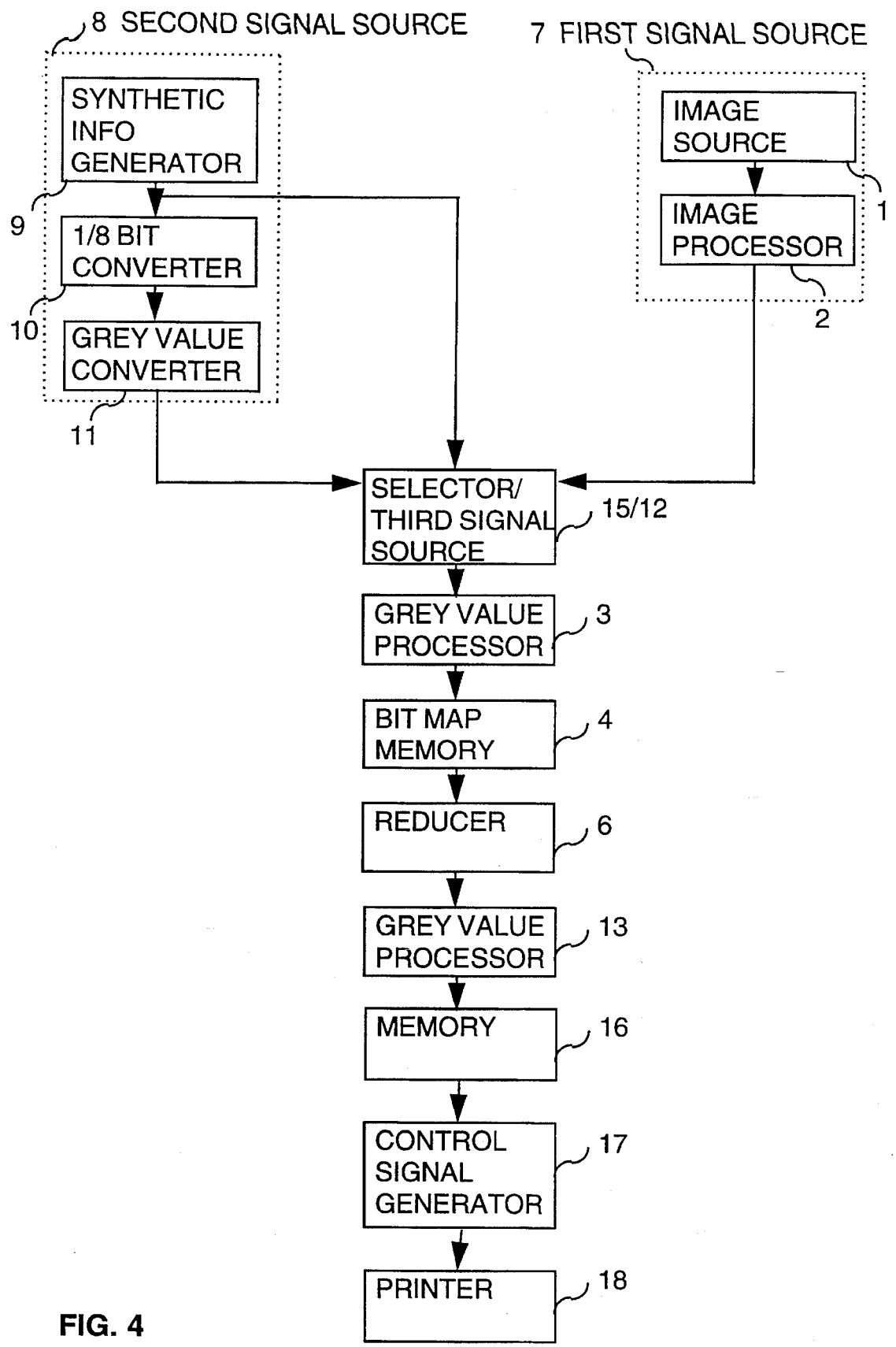

Those units in FIGS. 2, 3 and 4 which have not been discussed in detail have the same operation as the correspondingly designated units discussed in FIG. 1.

Figure 5:
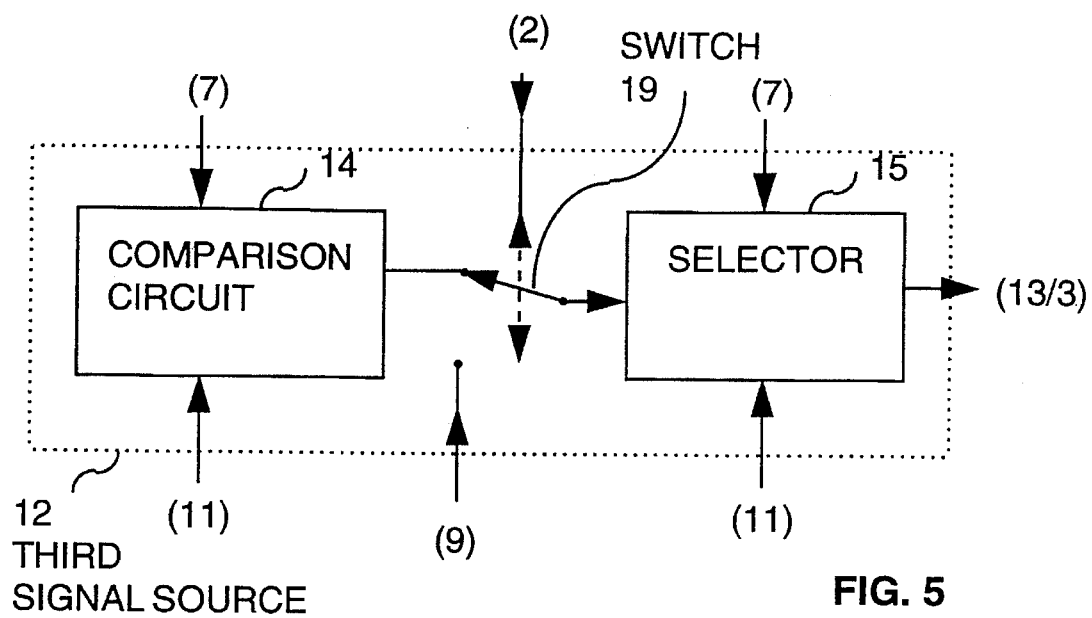

The two embodiments of the third signal generator 12 as used in the preceding Figures can also be used in a combined embodiment as shown in FIG. 5. In the case of operation as a selector circuit the signal generator 12 comprises the comparison circuit 14, fed by the signals of signal generator 7 and circuit 11. The trigger signal of circuit 14 is fed to the selection circuit 15 via switch 19 in the position shown in the Figure. The selection circuit 15 also receives the signals to be selected from signal generator 7 and circuit 11, and feeds the selected signal to the unit 13 (FIGS. 1 and 2) or unit 3 (FIGS. 3 and 4) respectively for performing a grey value processing operation. If the signal from circuit 11 has the greatest density value out of the signals to be supplied, the comparison circuit 14 will, for example, generate a trigger signal "1", the selection circuit 15 selecting the signal of the circuit 11 for the unit 13 or 3 respectively to perform the grey value processing operation. If, on the other hand, the signal from signal generator 7 has the greatest density value, then the comparison circuit 14 will generate a trigger signal "0" the selection circuit 15 letting the signal supplied by signal generator 7 pass.

In this switching state, the embodiment of the third signal generator 12 represents the configuration shown in FIGS. 1 and 3. If the switching unit 19 is set to the other switching state, then the trigger signal from unit 9 is fed to selection circuit 15. If unit 9 offers a signal "1" to the selection circuit 15, then the selection circuit 15 will let the signal supplied by the circuit 11 pass for the unit 13 or 3, respectively. In all other cases the selection circuit 15 will let the signal fed by the signal generator pass. In this switching state the embodiment of the third signal generator 12 represents the configuration shown in FIGS. 2 and 4. Switch 19 can be constructed in a manually operable version. In addition, it is possible to have the image processing unit 2 carry out a check on the type of information on the original. If the information in question on the original relates, for example, to a photograph, the processing unit 2 will generate a trigger signal which causes the switch 19 to pass into the switching position not shown. If the processing unit 2 detects information with line art on the original, then switch 19 passes to the switching position shown.

Figure 6:
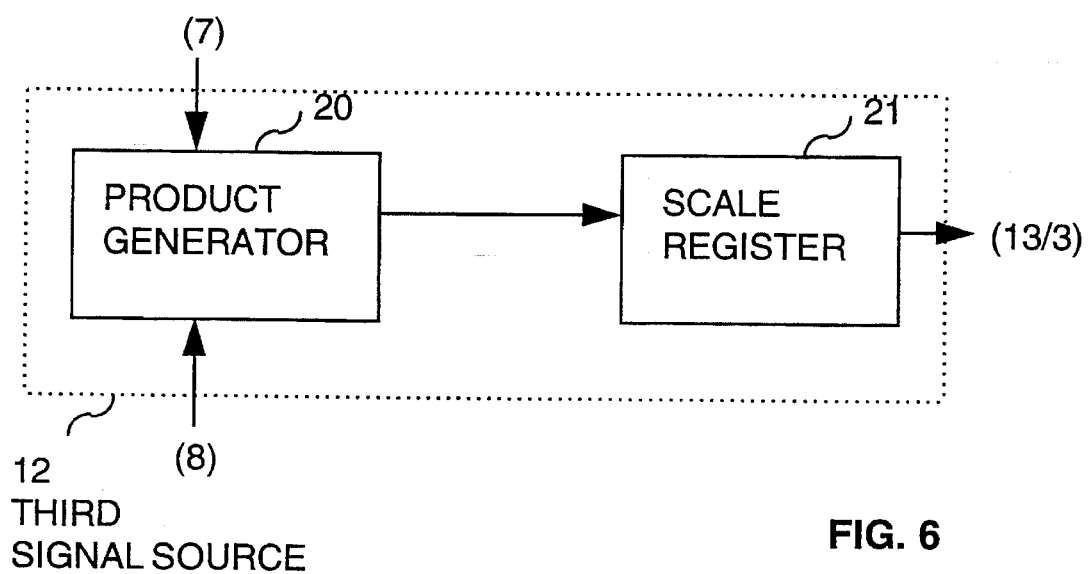
FIG. 6 shows a specific embodiment of a particular unit of the apparatus for generating, processing and selecting image information signals as shown in the said FIGS. 1 to 4.

It is also possible to construct the third signal generator 12 as a product generator 20 with a connected scale register 21 as shown in FIG. 6. In this case, the information value relating to the density value of the digital image information signal delivered by the signal generator 7 and that of the digital image information signal delivered by signal generator 8, are multiplied by one another in the product generator 20 and then the 8 most significant bits of the multiplication result are separated in the scale register 21 as the information value of the image information signal to be delivered by the third signal generator 12 for unit 13 or 3, respectively. If the black value of an image information signal is again represented by (00000000) and the white value by (11111111), then the product value will always represent a grey value which will always make the relevant information darker than (or equally dark as) the information associated with the separate image information signals.

Figure 7:
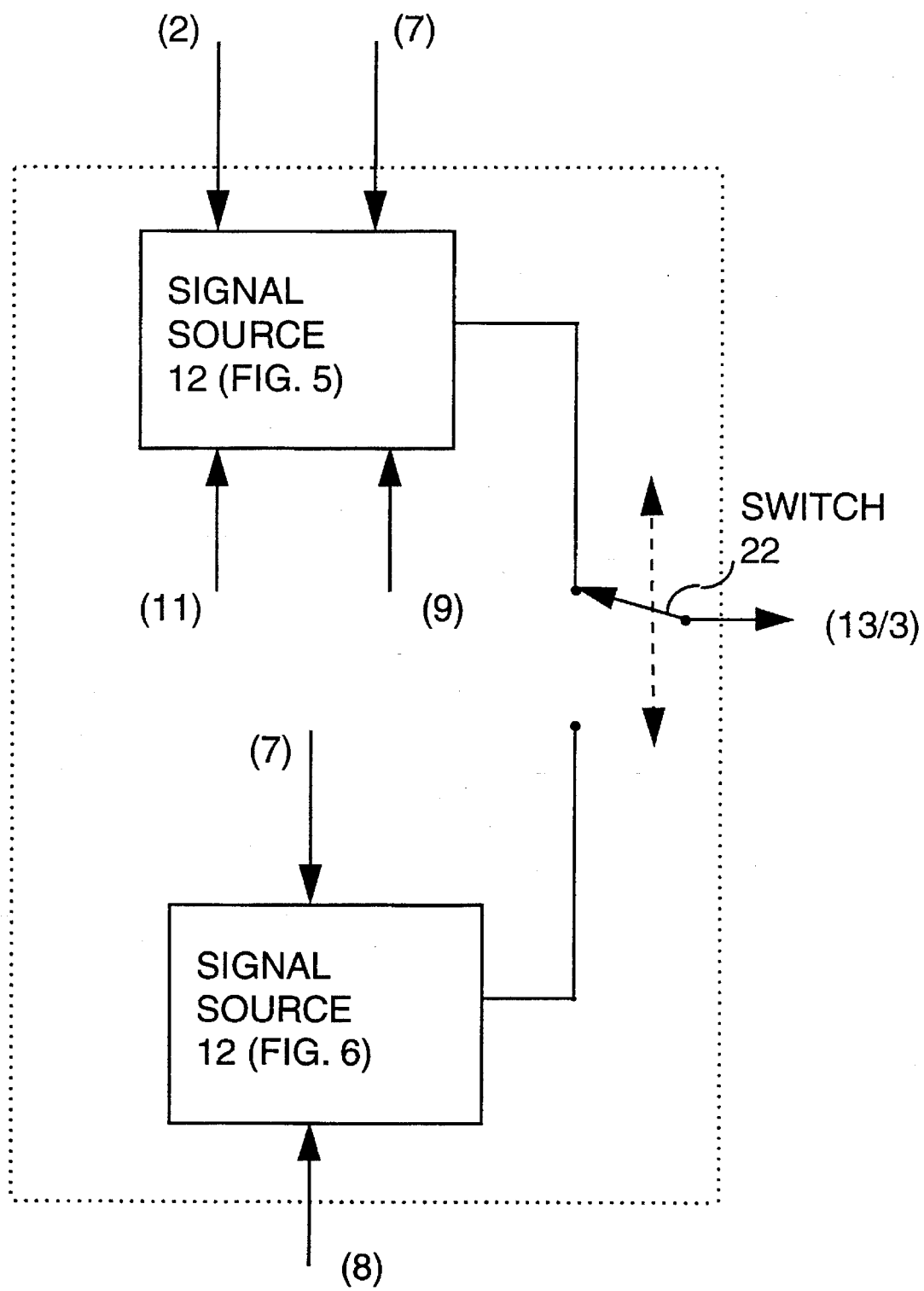
FIG. 7 illustrates an alternative embodiment of the unit shown in FIG. 6.

The circuit 12 of FIG. 5 and that of FIG. 6 can be included in parallel in a reproduction system of the kind discussed, as shown in FIG. 7. In this the output of the signal generator 12 shown in FIG. 5 and that of the signal generator 12 shown in FIG. 6 are connected to the unit 13 and 3 respectively via switch 22. For manual operation of switch 22 the reproduction system must have control means. There is no need to combine the units in a single apparatus. It is also possible to include these units in an open system. The application of the invention is not limited to the reproduction of information in the black/white or achromatic range. The invention can be successfully applied to the monochromatic range and even the multi-color range, in which case the selection criterion can also be based on the grey value component or intensity value in the measurement associated with an image point. If, for example, the R, G and B values are known of a colored image point, it is possible to determine by the UCR method how large the grey value component is in that colored image point. The grey value component is then also given as an extra data component by the first signal generator to such an image point for selection of the signals in the selector circuit.

Conversion circuits for converting RGB values to HSL values (or values in other related color spaces such as the LCH space or the CIELAB space) can be effectively used here, since they rapidly deliver the intensity component (L). If the second signal generator delivers the color information synthetically, the intensity component, in addition to any other settings required in connection with the image point, can be set by the user manually. Instead of selection based on grey value, it is also possible to select on color saturation (or chroma), which is also rendered possible by an RGB-HSL converter.

If it is desired to select on the basis of a combination of grey value and color separation, something which is not represented by comparable quantities, such is possible by using a look-up table which, by preprogramming, indicates for each pair of combinations of grey value and color separation, by means of selection data, what is preferred. The look up table then forms part of the comparison circuit 14. It is preferable to carry out the supply of image point information in identical parameters in respect of the color data as well, in order to avoid the subsequent need for conversion of some of the image points.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image reproduction method for reproducing image information from image reproduction signals, comprising:

generating digital image information signals of a first type by first and second signal sources, said digital image information signals containing values of elementary image points of the same spatial resolution for both said first and second signal sources, and being supplied in a multi-bit representation form having the same number of bits for each elementary image point and for both said signal sources, generation of said digital image information signals of said second signal source taking place in accordance with a predetermined density value, generating image information signals of a second type for each image point upon supply of said digital image information signals of said first type, making use of information content concerning density values present in said signals, said image information signals of said second type relating to image points of the same spatial resolution as said image information signals of said first type and having the same number of bits per image point as said image information signals of said first type; and converting said image information signals of said second type into said image reproduction signals by using grey value processing.

2. A method according to claim 1, wherein generation of said image information signals of said second type is effected by selecting for each image point on the basis of the density value, image information signals from the signals generated by said first and second signal sources.

3. A method according to claim 2, wherein said selection of image information signals takes places on the basis of a maximum density value in an image information signal.

4. A method according to claim 2, wherein said selection of image information signals takes place on the basis of a priority, given to an image information signal to be generated by said second signal source.

5. A method according to claim 1, wherein said information signal of said second type, to be generated for each image point, contains information concerning a density value obtained by a combination of the density values of the associated image information signals of said first type.

6. A method according to claim 1, wherein said image information signals to be generated by said first signal source are obtained at least partly by optical scanning and are subjected to grey value processing.

7. A method according to claim 1, wherein an image information signal is defined in a color space, and color component values associated with said image information signal are specified in a color space which is partly established by a quantity related to intensity.

8. A reproduction system for reproducing image information by means of image reproduction signals, comprising:

a first signal generator and a second signal generator for generating digital image information signals of a first type, said digital image information signals containing values of elementary image points of the same spatial resolution for both said first and second signal generators, said first and second signal generators being adapted to generate said signals in a multi-bit representation form having the same number of bits for each elementary image point and for both said signal generators, and said second signal generator being adapted to generate the image information signals in accordance with a predetermined density value;

a third signal generator for generating image information signals of a second type for each image point upon supply of said digital image information signals of said first type generated by said first and second signal sources, making use of information content concerning density values present in the said signals, said image information signals of said second type relating to image points of the same spatial resolution as said image information signals of said first type and having the same number of bits per image point as said image information signals of said first type; and means for performing grey value processing on the image information signals generated by said third signal generator, for the purpose of producing said image reproduction signals.

9. A reproduction system according to claim 8, further including a control means for setting the second signal generator to give said density value.

10. A reproduction system according to claim 8, wherein said first signal generator is provided with an optical image scanning unit and a connected image processing and grey value processing unit for generating image information signals, and a conversion unit for converting the latter image information signals into said multi-bit representation form.

11. A reproduction system according to claim 8, wherein said third signal generator has selection means for selecting, on the basis of density value for each image point, image information signals from the signals generated by said first and second signal generators.

12. A reproduction system according to claim 8, wherein said third signal generator is provided with a means for determining for each image point a density value of the image information signal of the second type on the basis of a combination of density values of associated image information signals of the first type.

13. A reproduction system according to claim 8, wherein said third signal generator is provided with a memory means (a look up table) which specifies paired combinations of grey value and color saturation value and also selection data in respect of each two paired combinations to be supplied.

14. A reproduction system according to claim 8, wherein said second signal generator is adapted to generate synthetic image information signals.

* * * * *